(12) United States Patent
Lanier et al.

(10) Patent No.: US 8,722,165 B2
(45) Date of Patent: May 13, 2014

(54) POLYETHYLENE ADDITIVE COMPOSITIONS AND ARTICLES MADE FROM SAME

(71) Applicant: Chevron Phillips Chemical Company LP, The Woodlands, TX (US)

(72) Inventors: Elizabeth M. Lanier, Bartlesville, OK (US); Bryan Hauger, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/670,297

(22) Filed: Nov. 6, 2012

(65) Prior Publication Data

US 2013/0122226 A1 May 16, 2013

Related U.S. Application Data

(63) Continuation of application No. 13/605,172, filed on Sep. 6, 2012, now abandoned.

(60) Provisional application No. 61/532,879, filed on Sep. 9, 2011.

(51) Int. Cl.
*B29C 47/00* (2006.01)
*F16L 9/12* (2006.01)
*F16L 9/127* (2006.01)
*C08K 3/22* (2006.01)
*C08L 23/04* (2006.01)

(52) U.S. Cl.
CPC . *F16L 9/12* (2013.01); *F16L 9/127* (2013.01); *C08K 3/22* (2013.01); *C08L 23/04* (2013.01)
USPC .......................................... 428/36.9; 524/432

(58) Field of Classification Search
CPC .................................... F16L 9/12; F16L 9/127
USPC .................... 428/36.9; 525/194, 192; 524/432
See application file for complete search history.

(56) References Cited

U.S. PATENT DOCUMENTS

| 3,248,179 A | 4/1966 | Norwood |
| 4,501,885 A | 2/1985 | Sherk et al. |

(Continued)

FOREIGN PATENT DOCUMENTS

| EP | 2100916 A1 | 9/2009 |
| EP | 2133367 A1 | 12/2009 |

(Continued)

OTHER PUBLICATIONS

Filing receipt and specification for provisional patent application entitled "Polyethylene Additive Compositions and Articles Made From Same," by Elizabeth M. Lanier, et al., filed Sep. 9, 2011 as U.S. Appl. No. 61/532,879.

(Continued)

*Primary Examiner* — N. Edwards
(74) *Attorney, Agent, or Firm* — Conley Rose, P.C.; Rodney B. Carroll; Cheryl L. Huseman (57) ABSTRACT

A method comprising forming a polymeric composition by adding zinc oxide to a polymer wherein a pipe formed from the polymeric composition displays a time to failure as determined in accordance with ASTM F2263-07(E1) that is increased by greater than about 25% when compared to an otherwise similar pipe formed from a polymeric composition lacking zinc oxide. A pipe comprising polyethylene and greater than about 0.5 wt. % zinc oxide having a time to failure as determined in accordance with ASTM F2263-07 (E1) that is at least about 25% greater than an otherwise similar pipe prepared in the absence of zinc oxide. A method comprising forming a composition comprising a polymer and zinc oxide into an article, and testing the structural integrity of the article when exposed to chlorinated water wherein the zinc oxide is present in an amount of from about 500 ppm to about 10000 ppm.

7 Claims, 4 Drawing Sheets

(56) References Cited

U.S. PATENT DOCUMENTS

| | | | |
|---|---|---|---|
| 4,588,790 | A | 5/1986 | Jenkins, III et al. |
| 5,352,749 | A | 10/1994 | DeChellis et al. |
| 5,436,304 | A | 7/1995 | Griffin et al. |
| 5,455,314 | A | 10/1995 | Burns et al. |
| 5,565,175 | A | 10/1996 | Hottovy et al. |
| 5,575,979 | A | 11/1996 | Hanson |
| 6,239,235 | B1 | 5/2001 | Hottovy et al. |
| 6,262,191 | B1 | 7/2001 | Hottovy et al. |
| 6,833,415 | B2 | 12/2004 | Kendrick et al. |
| 7,420,010 | B2 * | 9/2008 | Sukhadia et al. ............ 524/394 |
| 7,705,075 | B2 | 4/2010 | Kumar et al. |
| 7,744,972 | B2 | 6/2010 | Ho et al. |
| 8,110,262 | B2 * | 2/2012 | Lanier .......................... 428/35.7 |
| 8,492,492 | B2 * | 7/2013 | Mills et al. ...................... 526/89 |
| 2002/0068799 | A1 | 6/2002 | Hayashi |
| 2005/0181158 | A1 * | 8/2005 | Matsuoka et al. ........... 428/35.7 |
| 2006/0014903 | A1 * | 1/2006 | Vromman ..................... 525/192 |
| 2008/0146740 | A1 * | 6/2008 | Roth et al. .................... 525/194 |
| 2010/0119751 | A1 * | 5/2010 | Lanier ......................... 428/36.9 |
| 2010/0144988 | A1 * | 6/2010 | Foettinger et al. ............. 526/90 |
| 2012/0007272 | A1 * | 1/2012 | Krishnaswamy et al. . 264/209.1 |
| 2013/0122226 | A1 * | 5/2013 | Lanier et al. ................. 428/36.9 |

FOREIGN PATENT DOCUMENTS

| | | | |
|---|---|---|---|
| JP | 1087904 | A | 4/1989 |
| JP | 4353543 | A | 12/1992 |
| WO | 2009072073 | A1 | 6/2009 |
| WO | 2013036581 | A1 | 3/2013 |

OTHER PUBLICATIONS

Filing receipt and specification for patent application entitled "Polyethylene Additive Compositions and Articles Made From Same," by Elizabeth M. Lanier, et al., filed Sep. 6, 2012 as U.S. Appl. No. 13/605,172.

Chevron Phillips Chemical Company LP brochure entitled "Marlex® C514 High Density Polyethylene," Oct. 2007, Marlex Polyethylene, 1 page.

Chevron Phillips Chemical Company LP brochure entitled "Marlex® HP077 High Density Polyethylene," Apr. 2010, Marlex Polyethylene, 1 page.

Material Safety Data Sheet, Product Number C2997, "Zinc Oxide Technical Grade, Powder," http://www.sciencestuff.com/msds/C2997.html, Sep. 1, 2006, 2 pages, Science Stuff, Inc.

Pluimer, Michael, "Establishing 100-Year Service Life for Corrugated HDPE Drainage Pipe," 2006, 9 pages, published in "Pipelines 2006: Service to the owner: Proceedings of the Pipeline Division Speciality Conference," edited by Alan Atalah, et al., ASCE Publications.

"Oxidative-induction time," from Wikipedia, retrieved on Jul. 22, 2010, 1 page, http://en.wikipedia.org/wiki/Oxidative-induction_time.

Foreign communication from a related counterpart application—International Search Report and Written Opinion, PCT/US2012/053880 dated Feb. 1, 2013, 8 pages.

Todd, William G., "Variables that Affect/Control High-density Polyethylene Film Oxygen-Moisture Barrier," Journal of Plastic Film & Sheeting, Jul. 2003, pp. 209-220, vol. 19, Sage Publications.

Krohn, James, et al., "Factors Affecting the Permeability of PE Blown Films,"Jun. 1998, pp. 1-6 plus cover and information pages, Equistar—A Lyondell Company.

Krohn, James V., et al., "Optimizing Barrier Performance of Multi-Layer Polyethylene Films," Jun. 1998, pp. 1-9 plus cover and information pages, Equistar.

Database WPI, 1998-267236, abstract of JP10087904, XP-002690755, 2 pages, Jan. 25, 2013.

Database WPI, 1993-014316, abstract of JP4343097, XP-002690756, 1 page, Jan. 25, 2013.

* cited by examiner

POLYETHYLENE ADDITIVE COMPOSITIONS AND ARTICLES MADE FROM SAME

CROSS-REFERENCE TO RELATED APPLICATIONS

This application is a continuation of and claims priority to U.S. patent application Ser. No. 13/605,172 filed on Sep. 6, 2012 and entitled "Polyethylene Additive Compositions and Articles Made From Same," which claims priority to U.S. Provisional Application No. 61/532,879, filed on Sep. 9, 2011 and entitled "Polyethylene Additive Compositions and Articles Made from Same," which is incorporated by reference herein in its entirety.

FIELD

The present disclosure relates generally to improved polymer compositions. More particularly, the present disclosure relates to polymer compositions displaying improved resistance to degradation.

BACKGROUND

Articles produced from polymer compositions may have expected lifetimes of 50 to 100 years in some applications. When these same articles are used in applications that expose them to chlorinated water (e.g. potable water), this service lifetime can be decreased significantly. Thus, there is a need for polymeric compositions that display improved service lifetimes when exposed to chlorinated water.

SUMMARY

Disclosed herein is a method comprising forming a polymeric composition by adding zinc oxide to a polymer wherein a pipe formed from the polymeric composition displays a time to failure as determined in accordance with ASTM F2263-07(E1) that is increased by greater than about 25% when compared to an otherwise similar pipe formed from an otherwise similar polymeric composition lacking zinc oxide.

Also disclosed herein is a pipe comprising polyethylene and greater than about 0.5 wt. % zinc oxide having a time to failure as determined in accordance with ASTM F2263-07 (E1) that is at least about 25% greater than an otherwise similar pipe prepared in the absence of zinc oxide.

Further disclosed herein is a method comprising forming a composition comprising a polymer and zinc oxide into an article, and testing the structural integrity of the article when exposed to chlorinated water wherein the zinc oxide is present in an amount of from about 500 ppm to about 10000 ppm.

Further disclosed herein is a method comprising providing a polymeric composition comprising polyethylene, carbon black, and zinc oxide wherein the zinc oxide is present in an amount of greater than about 0.5 wt. % of the total weight of the polymeric compositions; and forming the polymeric composition into an article, and comparing the structural integrity of the article when exposed to chlorinated water to the structural integrity of a second article when exposed to chlorinated water wherein the second article is formed from an otherwise similar polymer composition lacking zinc oxide.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

To the extent that any definition or usage provided by any document incorporated herein by reference conflicts with the definition or usage provided herein, the definition or usage provided herein controls.

The terms "polymer," "polymer resin," "polyolefin," "polyolefin resin," and the like, are used herein to encompass any homopolymer of an olefin monomer or any copolymer of an olefin monomer with one or more comonomers. For example, this includes ethylene homopolymers and copolymers of ethylene and one or more comonomers. This also includes homopolymers, copolymers, terpolymers, etc., of any other olefin monomer disclosed herein (e.g., propylene). A polymer composition generally refers to at least one polymer and one or more additional components (e.g., a second polymer, an additive, etc.).

The term "ppm," an abbreviation for "parts per million," is used herein when reciting the weight percent of certain additives in a polyolefin composition, and is based on the weight of the polyolefin present in the polyolefin composition. For instance, 1000 ppm equates to 0.1 weight percent. Likewise, "ppm" is used herein when reciting the weight percent of certain additives in an article of manufacture, and is based on the weight of the polyolefin present in the article of manufacture. If more than one polyolefin is present in the polyolefin composition or in the article (e.g., a blend of two or more polyolefins), the amount in ppm is based on the total polyolefin content.

Disclosed herein are polymer compositions and methods of making and using same. In an embodiment, the polymer composition comprises an additive to prevent, reduce, or retard degradation of the polymer resulting from exposure to chlorinated water. Hereinafter, such compositions are termed chlorinated water-stabilized polymer compositions and designated CWS-PC.

The CWS-PC of the present disclosure, and specifically the polymer components thereof, can be produced by any appropriate polymerization method, using any appropriate type of polymerization reactor or reactors. As used herein, "polymerization reactor" includes any polymerization reactor capable of polymerizing monomers to produce homopolymers or copolymers. Such homopolymers and copolymers may be referred to as resins or polymers. The various types of reactors include those that may be referred to as batch, slurry, gas-phase, solution, high pressure, tubular or autoclave reactors, or other appropriate reactor capable of achieving a desired result. Gas-phase reactors may comprise fluidized bed reactors or staged horizontal reactors. Slurry reactors may comprise vertical or horizontal loops. High pressure reactors may comprise autoclave or tubular reactors. Reactor types can include batch or continuous processes. Continuous processes could use intermittent or continuous product discharge. Processes may also include partial or full direct recycle of un-reacted monomer, un-reacted comonomer, and/or diluent.

Polymerization reactor systems of the present disclosure may comprise one type of reactor in a system or multiple reactors of the same or different type. Production of polymers in multiple reactors may include single and/or multiple stages in one or more polymerization reactors. Multiple reactors may be interconnected by a transfer device making it possible to transfer the products, diluents and/or reactants from the one polymerization reactor to another reactor. The desired polymerization conditions in one of the reactors may be different, similar, or the same as the operating conditions of the other reactor or reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, a combination of loop and gas reactors, multiple high pressure reactors or a combination of high pressure with loop and/or gas reactors. Multiple reactors may be operated in series or in parallel.

According to an embodiment of the disclosure, the polymerization reactor system may comprise at least one loop slurry reactor. Such reactors may comprise vertical or horizontal loops. Monomer, diluent, catalyst and optionally any comonomer may be continuously fed to a loop reactor where polymerization occurs. Generally, continuous processes may comprise continuous introduction of a monomer, a catalyst, and/or a diluent into a polymerization reactor and/or the removal from this reactor of a suspension comprising polymer particles and the diluent, either continuously or as desired. Reactor effluent may be flashed to separate the solid polymer from the liquids that comprise the diluent, monomer and/or comonomer. Various technologies may be used for this separation step including but not limited to, flashing that may include any combination of heat addition and pressure reduction; separation by cyclonic action in either a cyclone or hydrocyclone; or separation by centrifugation.

A typical slurry polymerization process (also known as the particle form process), is disclosed, for example, in U.S. Pat. Nos. 3,248,179, 4,501,885, 5,565,175, 5,575,979, 6,239,235, 6,262,191 and 6,833,415, each of which is incorporated by reference in its entirety herein.

Suitable diluents used in slurry polymerization include without limitation the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment of the disclosure, the polymerization reactor may comprise at least one gas-phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas-phase reactors may comprise a process for multi-step gas-phase polymerization of olefins, in which monomers such as olefins are polymerized in the gaseous phase in at least two independent gas-phase polymerization zones while feeding a catalyst-containing polymer formed in a first polymerization zone to a second polymerization zone. One type of gas-phase reactor is disclosed in U.S. Pat. Nos. 5,352,749, 4588,790 and 5,436,304, each of which is incorporated by reference in its entirety herein.

According to still another embodiment of the disclosure, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure and the concentrations of various reactants. Polymerization temperature can affect catalyst productivity, polymer molecular weight and molecular weight distribution. Suitable polymerization temperature may be any temperature below the de-polymerization temperature according to the Gibbs free energy equation. Typically, this includes from about 60° C. to about 280° C., for example, and from about 70° C. to about 110° C., depending upon the type of polymerization and the reactor.

Suitable pressures will also vary according to the reactor and polymerization type. The pressure for liquid phase polymerizations in a loop reactor is typically less than 1000 psig. Pressure for gas-phase polymerization is usually at about 200 to about 500 psig. High pressure polymerization in tubular or autoclave reactors is generally run at about 20,000 to about 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce resins with certain physical and mechanical properties. The intended end-use product that will be formed by the resin and the method of forming that product helps determine the desired resin properties. Non-limiting examples of mechanical properties include tensile, flexural, impact, creep, stress relaxation and hardness tests. Physical properties may include, but are not limited to density, molecular weight, molecular weight distribution, melting temperature, glass transition temperature, temperature melt of crystallization, density, stereoregularity, crack growth, long chain branching, rheological measurements, and chemical resistance.

The concentrations of monomer, co-monomer, hydrogen, co-catalyst, modifiers, and electron donors are important in producing these resin properties. Comonomer may be used to control product density. Hydrogen can be used to control product molecular weight. Co-catalysts can be used to alkylate, scavenge poisons and control molecular weight. Modifiers can be used to control product properties and electron donors affect stereoregularity. In addition, the concentration of poisons is minimized because poisons impact the reactions and product properties.

The polymer or resin may be formed into various articles, including but not limited to, bottles, drums, toys, containers, utensils, film products, tanks, pipes, membranes, and liners. Various processes may be used to form these articles, including, but not limited to, blow molding, extrusion molding, rotational molding, thermoforming, cast molding and the like. In particular, the polymer or resin may be used to form a CWS-PC as described herein, which may be further formed into an end use article such as pipe.

After polymerization, additives and modifiers can be added to the polymer to provide better processing during manufacturing and for desired properties in the end product. Additives may include, but are not limited to surface modifiers such as slip agents, antiblocks, tackifiers; antioxidants such as primary and secondary antioxidants; pigments; processing aids such as waxes/oils and fluoroelastomers; and special additives such as stabilizers, fire retardants, antistats, scavengers, absorbers, odor enhancers, antimicrobials, preservatives, light stabilizers, and anti-degradation agents. Such additives may be used singularly or in combination and may be included in the polymer composition before, during or after preparation of the CWS-PC as described herein. Such additives may be added using any suitable technique, for example during an extrusion or a compounding step such as during pelletization or subsequent processing into an end use article.

In an embodiment, the CWS-PC comprises an additive that functions to reduce and/or inhibit degradation of a polymer when exposed to a chlorine-containing solution, and such additives are referred to herein as AIDs. For example, the chlorine-containing solution may comprise chlorinated drinking water wherein chloramine or chlorine is introduced to a water-source as a disinfectant, in an amount of equal to or less than about 4 ppm, alternatively less than about 3.5 ppm, or alternatively less than about 3 ppm. In an embodiment, the chlorine-containing solution is potable or drinking water, for example water from a municipal water supply. In an embodiment, the CWS-PC is formed into a pipe and exposed to water from a municipal water supply having chloride in an amount sufficient to meet applicable local, state, and/or federal standards. In an embodiment, the CWS-PC is formed into a pipe and exposed to a highly chlorinated water supply and/or water supplies having varying levels of chlorination, such as those encountered in recreational water sources such as pools, spas, hot tubs, water parks, and the like, and likewise which may be governed by applicable local, state, and/or federal standards.

In an embodiment, the AID comprises an acid scavenger. As used herein, an acid scavenger refers to a basic material that can react with a proton source. In an embodiment, the polymer is an olefin polymer (e.g., polyethylene homopolymer or copolymer) and the AID is a compound (e.g., basic material) present in an effective amount.

In an aspect, the AID is any compound chemically compatible with the polymeric composition (e.g., the polymer components thereof as well as any other components present therein) and is effective to prevent degradation of an article prepared from the polymeric composition when exposed to a chlorinated water source. In an embodiment, the AID comprises a metal oxide such as an oxide of zinc (ZnO). In embodiments, the AID (e.g., ZnO) is present in the CWS-PC in an amount of from about 500 ppm to about 10,000 ppm, alternatively from about 1000 ppm to about 9000 ppm, or alternatively from about 5000 ppm to about 8000 ppm. It is unexpectedly observed that the AID (e.g., ZnO) when present in the CWS-PC in the disclosed amounts reduces and/or inhibits degradation of the CWS-PC (e.g., the polymeric components thereof) as a result of exposure to chlorinated water. Any suitable methodology may be utilized to incorporate the AID into the polymeric composition. For example, the AID (e.g., ZnO) may be introduced to the CWS-PC during formation of the resin and/or extrusion of the reactor fluff. Alternatively, the AID may be introduced to the CWS-PC during the manufacture of one or more articles from the CWS-PC.

The CWS-PC may comprise a homopolymer, a copolymer, or blends thereof. In an embodiment, the CWS-PC comprises a polymer of ethylene with one or more comonomers such as alpha olefins. Examples of suitable comonomers include, but are not limited to, unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an embodiment, the CWS-PC comprises a copolymer of ethylene and hexane.

In an embodiment, a polymer suitable for use in the CWS-PC is characterized by a density of from about 0.93 g/cc to about 0.97 g/cc, alternatively from about 0.94 g/cc to about 0.97 g/cc, alternatively from about 0.96 g/cc to about 0.97 g/cc, or alternatively from about 0.95 g/cc to about 0.96 g/cc as determined in accordance with ASTM D-1505. For example, the polymer may be a polyethylene homopolymer or copolymer having a density of greater than about 0.95 g/cc, or alternatively greater than about 0.96 g/cc.

A polymer of the type described herein may be of any modality. Herein, the "modality" of a polymer refers to the form of its molecular weight distribution curve, i.e. the appearance of the graph of the polymer weight fraction as a function of its molecular weight. The polymer weight fraction refers to the weight fraction of molecules of a given size. A polymer having a molecular weight distribution curve showing a single peak may be referred to as a unimodal polymer, a polymer having a curve showing two distinct peaks may be referred to as a bimodal polymer, a polymer having a curve showing three distinct peaks may be referred to as a trimodal polymer, etc. Polymers having molecular weight distribution curves showing more than one peak may be collectively referred to as multimodal polymers.

The molecular weight distribution (MWD) of the CWS-PC may be characterized by the ratio of the weight average molecular weight to the number average molecular weight, which is also referred to as the polydispersity index (PDI) or more simply as polydispersity. The weight average molecular weight describes the molecular weight distribution of a polymer composition. The number average molecular weight is the common average of the molecular weights of the individual polymers. The z-average molecular weight is a higher order molecular weight average. All molecular weight averages are expressed in kilogram per mole (g/mol). $M_n$, and $M_w$, and $M_z$ may be calculated according to equations 1, 2, and 3 respectively where $N_i$ is the number of molecules of molecular weight $M_i$.

$$M_n = \frac{\Sigma_i N_i M_i}{\Sigma_i N_i} \qquad (1)$$

$$M_w = \frac{\Sigma_i N_i M_i^2}{\Sigma_i N_i M_i} \qquad (2)$$

$$M_z = \frac{\Sigma_i N_i M_i^3}{\Sigma_i N_i M_i^2} \qquad (3)$$

In an embodiment, the CWS-PC has a PDI of from about 5 to about 40, alternatively from about 10 to about 35, or alternatively from about 15 to about 30.

In an embodiment, the CWS-PC of this disclosure is fabricated into articles using any suitable methodology. For example, the CWS-PC may be formed into pipe by a shaping process such as extrusion. A method of making a polymeric pipe may comprise extruding the polymer or copolymer in a molten state through a die to form the polymeric pipe and cooling the pipe. Pipe extrusion in the simplest terms is performed by melting and conveying polymer (e.g., polyethylene) pellets into a particular shape (generally an annular shape), and solidifying that shape during a cooling process. There are numerous steps to pipe extrusion as provided below. The polymer feedstock can be a pre-pigmented polyethylene resin or it can be a mixture of polyethylene and color concentrate (referred to as "Salt and Pepper blends"). In North America, the most common feedstock for pipe extrusion is "Salt and Pepper blends." In Europe and other areas of the world, the most common feedstock for pipe extrusion is pre-pigmented polyethylene resin. In an embodiment, from about 0.5 wt. % zinc oxide to about 0.75 wt. % ZnO is added to the feedstock prior to or during the extrusion step to form a CWS-PC. The feedstock is then fed into an extruder. The most common extruder system for pipe production is a single-screw extruder. The purpose of the extruder is to melt, convey, and homogenize the polyethylene pellets. Extrusion temperatures typically range from 178° C. to 250° C. depending upon the extruder screw design and flow properties of the polyethylene.

The molten polymer is then passed through a die. The die distributes the homogenous polyethylene polymer melt around a solid mandrel, which forms it into an annular shape. Adjustments can be made at the die exit to try to compensate for polymer sag through the rest of the process. In order for the pipe to meet the proper dimensional parameters, the pipe is then sized. There are two methods for sizing: vacuum or pressure. Each sizing method employs different techniques and different equipment.

Next, the pipe is cooled and solidified in the desired dimensions. Cooling is accomplished by the use of several water tanks wherein the pipe is either submerged or water is sprayed on the pipe exterior. The pipe is cooled from the outside surface to the inside surface. The interior wall and inside surfaces of the pipe can stay very hot for a long period of time, as polyethylene is a poor conductor of heat. Finally, the pipe is printed and either coiled or cut to length.

Pipes formed from a CWS-PC of the type disclosed herein may display improved mechanical properties when subjected to chlorinated water having chloride present in the disclosed ranges as compared to pipes formed from an otherwise similar resin lacking an AID. The term "otherwise similar" as used herein is understood to include, but not limited to, embodiments where an "otherwise similar" polymer, polymeric composition, article, pipe or the like refers to the same or identical (including but not limited to the same or identical as determined within the tolerances or variances of known testing procedures or protocols) polymer, polymeric composition, article, pipe or the like with the exception of the specific feature that is identified as different (e.g., the presence or absence of ZnO). The term "otherwise similar" is also understood to include comparisons of inventive embodiments to control embodiments, where variables or parameters related to the polymer, polymeric composition, article, pipe or the like are held constant within accepted scientific practice as understood by those skilled in the art with the exception of one or more designated variables or parameters of interest (e.g., the presence or absence of ZnO).

In an embodiment, the CWS-PC comprises an ethylene polymer and ZnO and is formed into a PE-pipe. PE-pipes exposed to chlorinated water over time can display reduced structural integrity, in the form of cracks, ruptures, or leaks, which is typically attributed to chlorine-induced brittle oxidative failure (CBOF). In an embodiment, PE-pipes prepared from a CWS-PC of the type disclosed herein display improved structural integrity when exposed to a chlorinated water source when compared to an otherwise similar PE-pipe prepared from a polymeric material lacking an AID. The resistance of a PE pipe to CBOF can be expressed in terms of the time-to-failure (TTF) as determined in accordance with ASTM F2263-07(E1). In an embodiment, an article formed from a CWS-PC of the type disclosed herein may display a TTF that is increased when compared to an otherwise similar article formed from a polymer composition lacking an AID by equal to or greater than about 25%, alternatively greater than about 35%, or alternatively greater than about 50%.

In an embodiment, a method comprises providing a CWS-PC and forming the CWS-PC into an article. The method may further comprise evaluating the resistance of an article formed from a CWS-PC of this disclosure to structural degradation upon exposure to a chlorinated water source. An article's resistance to structural degradation upon exposure to chlorinated water is hereinafter termed the structural integrity index (SII) of the article. It is contemplated that the SII may be suitably correlated to a plurality of physical properties displayed by an article. For example, the article may be a pipe and the SII may be correlated to the TTF of a pipe formed from a CWS-PC of this disclosure.

In an embodiment the SII of a pipe formed from a CWS-PC of this disclosure may be obtained and compared to a SII of a pipe fabricated from an otherwise similar polymer composition lacking an AID.

In an embodiment a method comprises providing a CWS-PC and forming the CWS-PC into a pipe. The pipe may be further processed into a packaged product containing written material. In some embodiments, the written material may provide information on the SII of a pipe formed from a CWS-PC of the type disclosed herein alone or in comparison to a pipe formed from a polymeric material not containing an AID. In some embodiments, the written material may provide instructions and/or recommendations for utilization of the pipe in one or more applications. For example, the written material may indicate the pipe formed from a CWS-PC of the type disclosed herein is suitable for use in applications wherein the pipe is contacted with chlorinated water.

The following enumerated embodiments are provided as non-limiting examples:

1. A method comprising forming a polymeric composition by adding zinc oxide to a polymer wherein a pipe formed from the polymeric composition displays a time to failure as determined in accordance with ASTM F2263-07(E1) that is increased by greater than about 25% when compared to an otherwise similar pipe formed from an otherwise similar polymeric composition lacking the zinc oxide.

2. The method of embodiment 1 wherein the zinc oxide is present in the polymeric composition in an amount of from about 500 ppm to about 10,000 ppm.

3. The method of embodiment 1 or 2 wherein the zinc oxide is present in the polymeric composition in an amount of from about 1000 ppm to about 9,000 ppm.

4. The method of embodiment 1, 2, or 3 wherein the zinc oxide is added within a reactor, during extrusion of a reactor fluff, during formation of the pipe, or combinations thereof.

5. The method of embodiment 1, 2, 3, or 4 wherein the polymeric composition has a polydispersity index of from about 5 to about 40.

6. The method of embodiment 1, 2, 3, 4, or 5 wherein the polymer comprises polyethylene.

7. The method of embodiment 1, 2, 3, 4, 5, or 6 wherein the polymer has a density of from about 0.93 g/cc to about 0.97 g/cc.

8. The method of embodiment 6 or 7 wherein the polyethylene is a copolymer of ethylene and 1-hexene.

9. The method of embodiment 1, 2, 3, 4, 5, 6, 7, or 8 wherein the polymer is unimodal.

10. The method of embodiment 1, 2, 3, 4, 5, 6, 7, or 8 wherein the polymer is bimodal.

11. A pipe comprising polyethylene and greater than about 0.5 wt. % zinc oxide having a time to failure as determined in accordance with ASTM F2263-07(E1) that is at least about 25% greater than an otherwise similar pipe prepared in the absence of zinc oxide.

12. The pipe of embodiment 11 wherein the pipe comprises greater than about 0.75 wt. % zinc oxide.

13. The pipe of embodiment 11 or 12 further comprising carbon black.

14. The pipe of embodiment 11, 12, or 13 wherein the polyethylene has a density of from about 0.93 g/cc to about 0.97 g/cc.

15. The pipe of embodiment 11, 12, 13, or 14 wherein the polyethylene is metallocene catalyzed.

16. The pipe of embodiment 11, 12, 13, 14, or 15 wherein the polyethylene is a copolymer of ethylene and 1-hexene.

17. A method comprising forming a polymeric composition comprising a polymer and zinc oxide into an article wherein the zinc oxide is present in an amount of from about 500 ppm to about 10000 ppm; and testing the structural integrity of the article when exposed to chlorinated water.

18. The method of embodiment 17 wherein the zinc oxide is present in the polymeric composition in an amount of from about 1000 ppm to about 9000 ppm.

19. The method of embodiment 17 or 18 wherein the zinc oxide is present in the polymeric composition in an amount of greater than about 0.50 wt. % based on the total weight of the polymer composition.

20. The method of embodiment 17, 18, or 19 wherein the polymer comprises polyethylene.

21. The method of embodiment 17, 18, 19, or 20 wherein the polymer has a density of from about 0.93 g/cc to about 0.97 g/cc.

22. The method of embodiment 17, 18, 19, 20, or 21 wherein the article is a pipe.

23. A packaged product comprising the pipe of embodiment 22 and written instructions regarding contacting the pipe with chlorinated water.

24. A method comprising providing a polymeric composition comprising polyethylene, carbon black, and zinc oxide wherein the zinc oxide is present in an amount of greater than about 0.5 wt. % of the total weight of the polymeric composition; forming the polymeric composition into an article; and comparing the structural integrity of the article when exposed to chlorinated water to the structural integrity of a second article when exposed to chlorinated water, wherein the second article is an otherwise similar article formed from a polymeric composition lacking the zinc oxide.

25. The method of embodiment 24 wherein the articles are pipes.

26. The method of embodiment 23 or 24 further comprising providing a packaged product comprising the pipe and written instructions, wherein the written instructions include information on utilization of the pipe in applications involving contact with chlorinated water.

EXAMPLES

Example 1

The effect of an AID on the stability of pipes made from a CWS-PC of the type described herein was investigated. Two sample compositions were prepared and tested for their ability to withstand degradation when exposed to a chlorine source. All samples contained MARLEX® HP132 as the base resin. MARLEX® HP132 high-density polyethylene is commercially available from Chevron Phillips Chemical Company LP. Sample 1 in addition to MARLEX® HP132 also contained 0.2 wt. % IRGANOX 1010, 0.2 wt. % IRGAFOS 168, 0.03 wt. % fatty acid salt, and 0.04 wt. % VITON FREE-FLOW Z200 process aid. Sample 2 in addition to MARLEX® HP132 also contained 0.2 wt. % IRGANOX 1010, 0.2 wt. % IRGAFOS 168, 0.03 wt. % fatty acid salt, 0.04 wt. % VITON FREEFLOW Z200 and 0.75 wt. % ZnO. IRGANOX 1010 phenolic primary antioxidant for processing and long-term thermal stabilization is a sterically hindered phenolic antioxidant and IRGAFOS 168 is a hydrolytically stable phosphate processing stabilizer which are both commercially available. Table 1 presents the density, HLMI, tensile strength at yield, PENT, and the results of oxidative induction time (OIT) tests performed on specimens prepared from the samples. The OIT refers to the time between oxygen exposure and the onset of decomposition of a material under isothermal conditions and is a measure of the oxidative stability of the material and may be determined in accordance with ASTM D 3895.

TABLE 1

| Sample No. | Density (g/cm$^3$) | HLMI (g/10 min.) | Tensile Strength at Yield (psi) | PENT (hrs) | OIT (min) |
| --- | --- | --- | --- | --- | --- |
| 1 | 0.9477 | 8.87 | 3710 | >3985 | 160 |
| 2 | 0.9531 | 9.45 | 3720 | >3985 | 133 |

The high load melt index (HLMI) represents the rate of flow of a molten polymer through an orifice of 0.0825 inch diameter when subjected to a force of 21,600 grams at 190° C. as determined in accordance with ASTM D1238. The tensile strength at yield refers to the tensile stress where an increase in strain no longer results in an increase in stress on a stress-strain curve as determined accordance with ASTM D638. The Pennsylvania Edge-Notch Tensile Test (PENT) was used to measure the time to failure due to slow crack growth and conducted in accordance with ASTM F1473 with the exception that the specimens did not fail in the time tested as indicated in Table 1. Sample 1 is representative of a conventional composition used to prepare articles having an improved chlorine resistance while Sample 2 comprises a CWS-PC of the type disclosed herein. The samples were further processed to include MARLEX® M368 black concentrate which is a black masterbatch commercially available from Chevron Phillips Chemical Company LP. Samples 1 and 2 containing MARLEX® M368 were designated Samples 1A and 2A respectively. Table 2 presents the weight percent carbon black (i.e., MARLEX® M368), density, HLMI, tensile strength at yield, PENT, and results of OIT tests performed on specimens prepared from Samples 1A and 2A. Carbon black testing was conducted in accordance with ASTM D1603.

TABLE 2

| Sample No. | Carbon Black (wt. %) | Density (g/cm$^3$) | HLMI (g/10 min.) | Tensile Strength at Yield (psi) | PENT (hrs) | OIT (min.) |
|---|---|---|---|---|---|---|
| 1A | 2.27 | 0.9588 | 8.54 | 3740 | >3985 | 156 |
| 2A | 2.92 | 0.9647 | 8.54 | 3770 | >3985 | 152 |

The density of all the samples was increased by the addition of MARLEX® M368. Further, Sample 2A (comprising a CWS-PC of the type disclosed herein) contains more carbon black than Sample 1A however this is a natural consequence of the incorporation of the refactory zinc oxide material and represents an approximate sum of the amount of zinc oxide and carbon black.

Samples 1A and 2A were used to prepare pipe specimens and investigated to examine the influence of chlorinated water on the pipe samples. Specimens were tested as 15" length pipes with polyvinylidene fluoride (PVDF) compression fittings and PVDF inserts on both pipe ends. The length-to-diameter ratio is nominally 24. Specimens were exposed to continuous flowing chlorinated reverse osmosis (RO) water and tested in general accordance with ASTM F2263-07(E1) under conditions as detailed in Table 3.

TABLE 3

| Parameter | Actual | Control Limits |
|---|---|---|
| pH | 6.8 | ±0.2 |
| Chlorine (mg/L) | 4.4 | ±0.2 |
| ORP (mV) | >825 | Measured |
| Flow Rate (USGPM) | 0.1 | ±10% |

* The Fluid and Air Temperature were controlled at the same set-point. No measurable temperature drop across the test specimens was observed.

Two specimens of each formulation of the ½ inch extruded black tubing were tested at under accelerated temperature and pressure conditions of (a) 90° C. and 120 psig, (b) 90° C. and 100 psig or (c) 80° C. and 120 psig. The results of these experiments are presented in Table 4.

TABLE 4

| Sample No | Temperature (° C.) | Pressure (psig) | Specimen ID | Hoop Stress (psi) | Test Time (h) |
|---|---|---|---|---|---|
| 1A | 80 | 120 | 1-1 | 356 | 2486 |
|  |  |  | 1-2 | 355 | 2658 |
|  | 90 | 100 | 1-1 | 296 | 2440 |
|  |  |  | 1-2 | 297 | 2340 |
|  |  | 120 | 1-1 | 357 | 1524 |
|  |  |  | 1-2 | 352 | 1294 |
| 2A | 80 | 120 | 3-1 | 353 | 4759 |
|  |  |  | 3-2 | 354 | 5376 |
|  | 90 | 100 | 3-1 | 294 | 6549 |
|  |  |  | 3-2 | 300 | 7313 |
|  |  | 120 | 3-1 | 360 | 3496 |
|  |  |  | 3-2 | 354 | 4824 |

* Failure occurred away from the inlet

Figure 1:
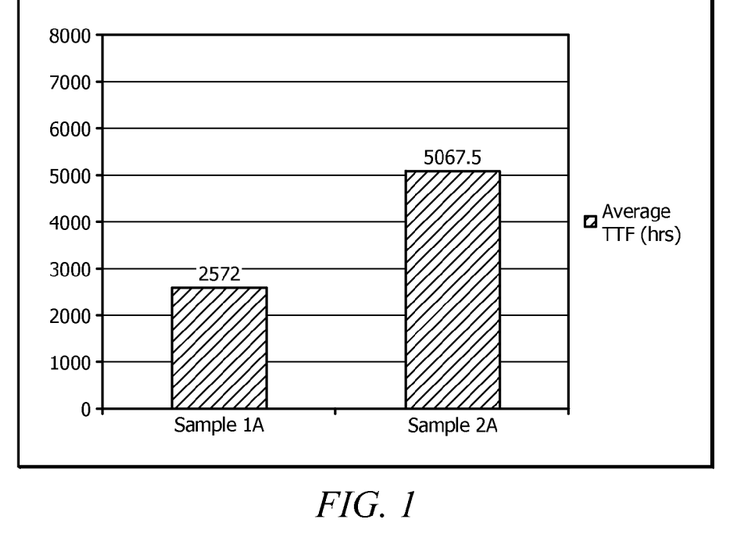
FIGS. 1-3 are plots of the average failure time as a function of sample type for the samples from example 1.
Figure 2:
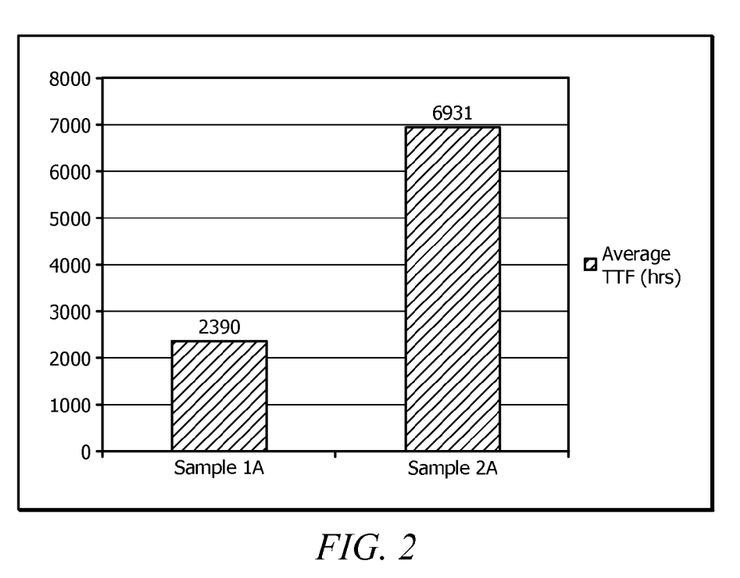
Figure 3:
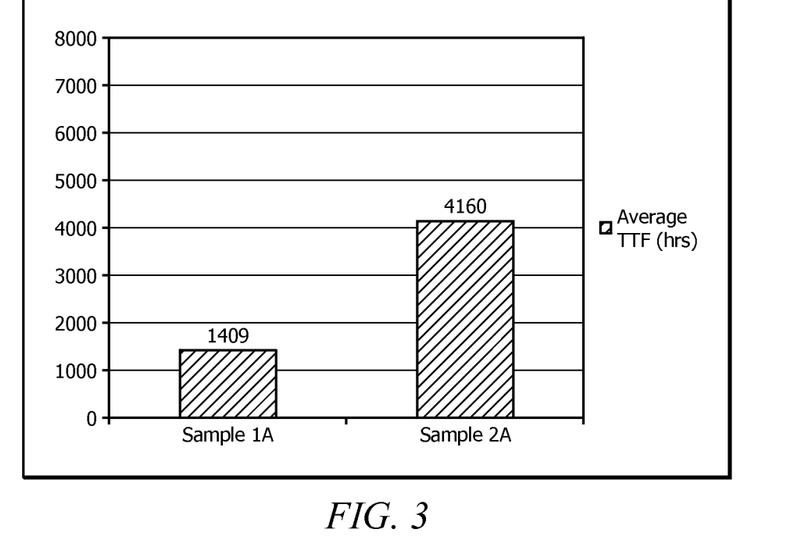

The hoop stress refers to a circumferential stress in a cylindrically shaped part as a result of internal or external pressure and may be determined in accordance with ASTM D1598. Referring to Table 4, all samples failures displayed a thick layer of degradation on the inside surface with moderate to extensive micro-cracking and minor to moderate radial cracking observed. The failures appeared to initiate on the inner pipe surface in the form of micro-cracks that propagated through the pipe wall to result in ultimate failure. Failure was due to a loss of fluid at a brittle slit perforation, which appeared to be caused by CBOF. A minor ductile lip was typically observed on the outside surface of each failure. A detailed examination of the inside surface of the failures revealed that the slit fractures may be associated with the die lines of the pipe. It appeared that the failure often occurs along a die line and can be unusually long for a brittle oxidative failure. The straight and elongated patterns of degradation on the inner surface also suggested that there may be preferential degradation along the die lines. The time to failure (TTF) for each sample under conditions a, b, and c are presented in FIGS. 1, 2, and 3 respectively.

The average TTF for each sample under conditions a, b, and c are given in Table 5.

TABLE 5

| Condition | Sample | Average TTF (hours) |
|---|---|---|
| a | 1A | 2572 |
| a | 2A | 5067.5 |
| b | 1A | 2390 |
| b | 2A | 6931 |
| c | 1A | 1409 |
| c | 2A | 4160 |

The results demonstrate that the comparative sample, sample 1A, under condition (a) exhibited a 50.8% reduction in TTF when compared to a sample prepared from a CWS-PC of the type disclosed herein. Under conditions (b) and (c) the comparative sample displayed respectively a 47.2% and 27.8% reduction in TTF when compared to a pipe prepared from a CWS-PC of the type disclosed herein.

Example 2

Figure 4:
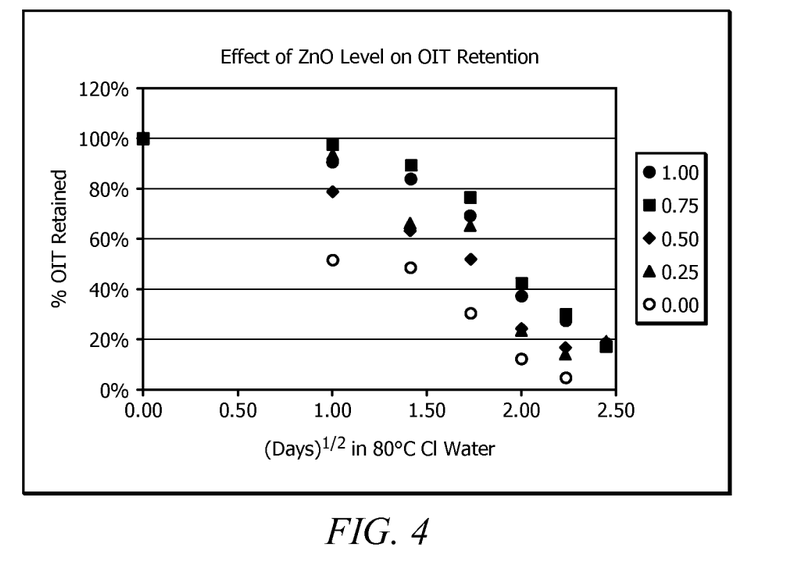
FIG. 4 is a plot of the percentage OIT retained as a function of time at various zinc oxide amounts for the samples from example 2.

The effect of ZnO concentration on the oxidative induction time of a CWS-PC of the type described herein was investigated. The OIT of plaques prepared from the CWS-PC was determined and are presented in FIG. 4.

Example 3

Figure 5:
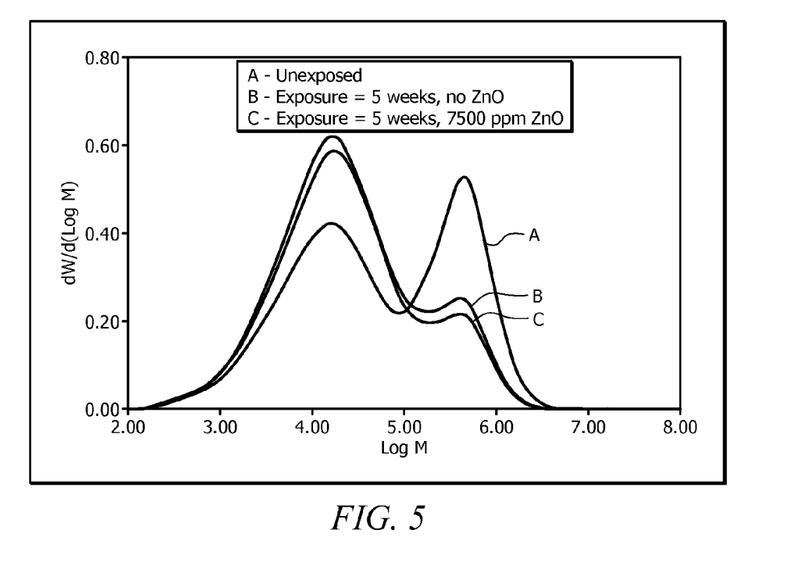
FIG. 5 is a plot of the molecular weight distribution for the samples from example 3.

The effect of the presence of ZnO on polymer degradation was investigated and is depicted in FIG. 5 which shows gel permeation chromatographs of three PE samples. The three PE samples all contained the same base resin, 2000 ppm SONGNOX 1010 and 2000 ppm SONGNOX 1680. SONGNOX 1010 and SONGNOX 1680 are phenolic antioxidants commercially available from Songwon Industrial.t Chromatograph A is of a PE resin that has not been exposed to a chlorinated water source. Chromatographs B and C are graphs of PE resins that have both been exposed to chlorinated water for 5 weeks. Chromatograph B is of a PE resin that does not contain ZnO while Chromatograph C is of a PE resin that contains 7500 ppm ZnO. While both Chromatographs B and C show degradation of the PE resin as evinced by the increase in the LMW component with a concomitant decrease in the HMW component, PE resin containing ZnO, i.e., as shown in Chromatograph C displays less degradation than the PE resin lacking ZnO, as shown in Chromatograph B.

Example 4

The effect of the addition of an AID of the type described herein on polymer degradation was investigated. A base resin, MARLEX® H525, polyethylene is a polyethylene hexane copolymer commercially available from Chevron Phillips Chemical Company LP was used to prepare 12.5 mil thick plaques. Each sample contained 0.2 wt. % SONGNOX 1010, and 0.2 wt. % SONGNOX 1680. The samples, designated samples A, B, C, D, and E contained 0, 0.1 wt. %, 0.25 wt. %, 0.5 wt. % and 0.75 wt. % ZnO respectively. The plaques were aged in chlorinated water at a temperature of 80° C. A mixture of sodium hypochlorite and HCl was used to adjust the room temperature pH and ORP to 6.8 and greater than 825, respectively. The OIT values of the plaques were measured by differential scanning calorimetry prior to exposure to the chlorinated water and then every 24 hours thereafter. The results of these experiments are shown in Table 6.

TABLE 6

| Sample | 0 | 1 | 2 | 3 | 4 | 5 | 6 | 7 |
|---|---|---|---|---|---|---|---|---|
| Average OIT (min) after Days in 80° water | | | | | | | | |
| A | 100 | 71 | 30 | 20 | 8 | 4 | 0 | 0 |
| B | 120 | 103 | 40 | 30 | 20 | 16 | 10 | 6 |
| C | 151 | 144 | 76 | 58 | 44 | 25 | 5 | 4 |
| D | 146 | 132 | 67 | 43 | 27 | 14 | 3 | 3 |
| E | 145 | 119 | 65 | 38 | 29 | 16 | 6 | 0 |
| Percentage OIT retained | | | | | | | | |
| A | 100 | 71 | 31 | 20 | 8 | 4 | 0 | 0 |
| B | 100 | 86 | 33 | 25 | 17 | 13 | 8 | 5 |
| C | 100 | 95 | 50 | 38 | 29 | 17 | 3 | 3 |
| D | 100 | 91 | 46 | 30 | 18 | 10 | 2 | 2 |
| E | 100 | 82 | 45 | 26 | 20 | 11 | 4 | 0 |

Example 5

Figure 6A:
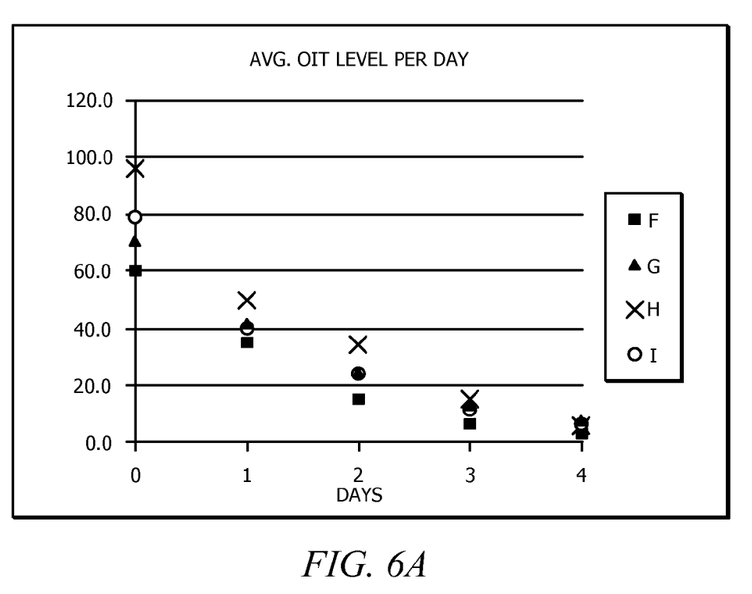
FIGS. 6A and 6B are plots of the percentage OIT retained as a function of time at various zinc oxide amounts for the samples from example 5.
Figure 6B:
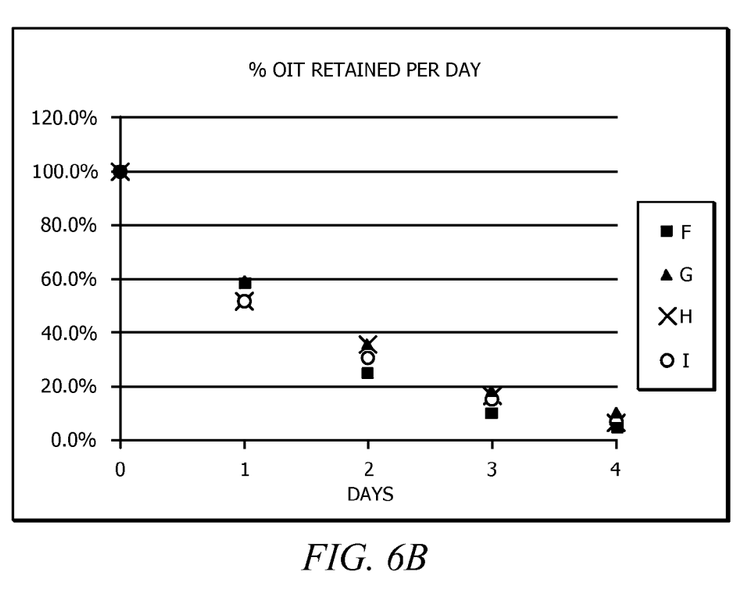

The effect of the addition of an AID of the type described herein on polymer degradation was investigated. A base resin, MARLEX® HHM TR-130, a medium density polyethylene resin commercially available from Chevron Phillips Chemical Company LP was used to prepare 12.5 mil thick plaques. Each sample contained 0.2 wt. % SONGNOX 1010, 0.1 wt. % DOVERPHOS S-9228, and 0.03 wt. % fatty acid salt. DOVERPHOS S-9228 is a solid phosphite commercially available from Dover Chemical Corporation. The samples, designated samples F, G, H, and I contained 0, 0.1 wt. %, 0.25 wt. %, and 0.5 wt. % ZnO respectively. The plaques were aged in chlorinated water at a temperature of 80° C. A mixture of sodium hypochlorite and HCl was used to adjust the room temperature pH and ORP to 6.8 and greater than 825, respectively. The OIT values of the plaques were measured by differential scanning calorimetry prior to exposure to the chlorinated water and then every 24 hours thereafter. The results of these experiments are shown in Table 7 and depicted in FIGS. 6A and 6B.

TABLE 7

| Sample | 0 | 1 | 2 | 3 | 4 |
|---|---|---|---|---|---|
| Average OIT (min) after Days in 80° Cl water | | | | | |
| F | 60 | 35 | 15 | 6 | 3 |
| G | 70 | 42 | 25 | 13 | 7 |
| H | 95 | 50 | 34 | 15 | 6 |
| I | 79 | 40 | 24 | 12 | 5 |
| Percentage OIT retained | | | | | |
| F | 100 | 58 | 25 | 10 | 5 |
| G | 100 | 60 | 36 | 19 | 11 |
| H | 100 | 52 | 35 | 16 | 7 |
| I | 100 | 51 | 31 | 15 | 7 |

While embodiments have been shown and described, modifications thereof can be made by one skilled in the art without departing from the spirit and teachings of the disclosure. The embodiments described herein are exemplary only, and are not intended to be limiting. Many variations and modifications of the embodiments disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A pipe formed from a chlorinated water-stabilized polymer composition comprising polyethylene and greater than about 0.5 wt. % zinc oxide having a time to failure as determined in accordance with ASTM F2263-07(E1) that is at least about 25% greater than an otherwise similar pipe prepared in the absence of zinc oxide, wherein the composition has a polydispersity ranging from greater than 10 to about 40.

2. The pipe of claim 1 wherein the composition comprises greater than about 0.75% zinc oxide.

3. The pipe of claim 1 wherein the composition further comprises carbon black.

4. The pipe of claim 2 wherein the polyethylene has a density of from about 0.93 g/cc to about 0.97 g/cc.

5. The pipe of claim 1 wherein the polyethylene is metallocene catalyzed.

6. The pipe of claim 1 wherein the polyethylene is a copolymer of ethylene and 1-hexene.

7. A packaged product comprising the pipe of claim 1 and written instructions regarding contacting the pipe with chlorinated water.

* * * * *